(12) United States Patent
Matsui et al.

(10) Patent No.: US 12,510,390 B2
(45) Date of Patent: Dec. 30, 2025

(54) ULTRASONIC FLOWMETER

(71) Applicant: Keyence Corporation, Osaka (JP)

(72) Inventors: Hiroki Matsui, Osaka (JP); Daiki Matsumoto, Osaka (JP); Ryuma Miyake, Osaka (JP)

(73) Assignee: KEYENCE CORPORATION, Osaka (JP)

( * ) Notice: Subject to any disclaimer, the term of this patent is extended or adjusted under 35 U.S.C. 154(b) by 306 days.

(21) Appl. No.: 18/372,105

(22) Filed: Sep. 24, 2023

(65) Prior Publication Data

US 2024/0125635 A1  Apr. 18, 2024

(30) Foreign Application Priority Data

Oct. 17, 2022 (JP) ................. 2022-166040

(51) Int. Cl.
*G01F 1/66* (2022.01)
*G01F 15/18* (2006.01)

(52) U.S. Cl.
CPC ............ *G01F 1/662* (2013.01); *G01F 15/185* (2013.01)

(58) Field of Classification Search
CPC ......... G01F 1/662; G01F 15/185; G01F 1/667
See application file for complete search history.

(56) References Cited

U.S. PATENT DOCUMENTS

| | | | | |
|---|---|---|---|---|
| 4,467,659 A | * | 8/1984 | Baumoel | G01F 1/667 73/644 |
| 5,467,321 A | * | 11/1995 | Baumoel | G01F 1/667 73/861.27 |
| 6,047,602 A | * | 4/2000 | Lynnworth | G01F 1/662 73/632 |
| 7,363,174 B2 | * | 4/2008 | Kishiro | G01F 25/10 73/861.26 |
| 9,506,788 B2 | * | 11/2016 | van Klooster | G10K 11/002 |
| 9,671,263 B2 | | 6/2017 | Otsu et al. | |
| 9,671,264 B2 | | 6/2017 | Kashima | |
| 9,696,195 B2 | | 7/2017 | Ishikawa et al. | |
| 10,190,896 B2 | | 1/2019 | Makino et al. | |
| 10,641,628 B2 | | 5/2020 | Niimura | |
| 10,641,629 B2 | | 5/2020 | Tsukigi et al. | |
| 10,732,018 B2 | | 8/2020 | Tsukigi et al. | |
| 10,845,225 B2 | | 11/2020 | Kawaguchi | |
| 11,099,042 B2 | | 8/2021 | Matsui et al. | |

(Continued)

FOREIGN PATENT DOCUMENTS

JP    2020109360 A    7/2002

OTHER PUBLICATIONS

U.S. Appl. No. 18/372,102, filed Sep. 24, 2023 (47 pages).

*Primary Examiner* — Francis C Gray
(74) *Attorney, Agent, or Firm* — Kilyk & Bowersox, P.L.L.C.

(57) ABSTRACT

To enable accurate measurement of a flow rate of a gas flowing in a non-metallic tube. An ultrasonic flowmeter includes a first wedge member having a first angle, a second wedge member having a second angle, and a flow rate measurement unit that measures a flow rate of a gas based on a propagation time difference of a longitudinal wave excited by a tube. The first angle and the second angle are configured such that the tube excites both a longitudinal wave and a shear wave, and a mixing ratio of the shear wave to the longitudinal wave is 10% or less.

20 Claims, 12 Drawing Sheets

(56) References Cited

U.S. PATENT DOCUMENTS

2015/0355002 A1* 12/2015 Sasaki .................... G01F 1/667
                                                      73/861.28
2023/0066279 A1   3/2023 Kawaguchi et al.

* cited by examiner

ULTRASONIC FLOWMETER

CROSS-REFERENCE TO RELATED APPLICATIONS

The present application claims foreign priority based on Japanese Patent Application No. 2022-166040, filed Oct. 17, 2022, the contents of which are incorporated herein by reference.

BACKGROUND OF THE INVENTION

1. Field of the Invention

The disclosure relates to an ultrasonic flowmeter that measures a flow rate of a fluid flowing through a flow path using an ultrasonic signal.

2. Description of Related Art

As a measuring instrument that measures a flow rate of a fluid flowing through a flow path, a thermal flow sensor is generally known. The thermal flow sensor includes an upstream heater and a downstream heater arranged in a flow path, detects a change in temperature distribution of the upstream heater and the downstream heater when a fluid flows, and measures a flow rate based on a result of the detection.

In the thermal flow sensor, however, measurement is not stable when uneven flow or turbulent flow flutters occur, and thus, a rectifying plate is required upstream of the heaters. When the rectifying plate is provided, a pressure loss is generated, the rectifying plate is easily clogged with contaminants so that the pressure loss may be further increased. Further, the heaters of the thermal flow sensor are vulnerable to dirt and are fragile, which is disadvantageous.

Meanwhile, an ultrasonic flowmeter is known as a measuring instrument that measures a flow rate of a fluid flowing through a flow path using an ultrasonic signal (see, for example, JP 2020-109360 A). An ultrasonic flowmeter disclosed in JP 2020-109360 A is a clamp-on type ultrasonic flowmeter that is detachably attached to an outer wall of metal piping and measures a flow rate of a gas from the outside of the metal piping.

A measurement principle of the clamp-on type ultrasonic flowmeter of JP 2020-109360 A is a so-called propagation time difference type in which an ultrasonic signal is caused to obliquely pass through the gas flowing in the metal piping, a propagation time difference of the ultrasonic signal is measured between a direction along the flow and a direction opposite to the flow, and a flow velocity and the flow rate of the gas are calculated from the propagation time difference.

Meanwhile, for example, in a pneumatic system such as an air cylinder, operation timing adjustment, adjustment of a blow rate, and the like of the air cylinder are adjusted by a speed controller, an opening amount of a throttle valve based on an air pressure set by a regulator. If a flowmeter is arranged in the middle of a flow path of the pneumatic system, an operation of the system can be managed based on a flow rate, which is effective.

However, if the thermal flow sensor is arranged, an adjustment condition varies due to the generation of the pressure loss by the rectifying plate described above, so that readjustment is required, and highly frequent adjustment and maintenance are required due to the clogging over time.

In this regard, if the clamp-on type ultrasonic flowmeter of JP 2020-109360 A is used, it is unnecessary to arrange the rectifying plate in the flow path, and thus, it is considered that a problem as in the case of arranging the thermal flow sensor does not occur.

However, the clamp-on type ultrasonic flowmeter of JP 2020-109360 A enables accurate measurement of the flow rate of the fluid by enhancing a signal using a resonance phenomenon of the metal piping and improving a signal-to-noise ratio (S/N). Therefore, the attachment to the metal piping is a premise, and a sound velocity is slow with a soft resin piping generally used in the pneumatic system so that it is difficult to excite a guide wave used in the metal piping.

Further, in JP 2020-109360 A, it is possible to measure a liquid flowing inside by transmitting an ultrasonic signal for flow rate measurement from the outside of the metal piping, but, in a case where a target fluid is a gas as in the pneumatic system, the gas has a smaller density and a slower sound velocity than the liquid, and thus, a signal intensity decreases when measurement is performed from the outside of the piping, and it is difficult to perform the measurement.

SUMMARY OF THE INVENTION

The disclosure has been made in view of such a point, and an object thereof is to enable accurate measurement of a flow rate of a gas flowing in a non-metallic tube.

In order to achieve the above object, according to one embodiment of the disclosure, it is possible to assume an ultrasonic flowmeter that measures a flow rate of a gas flowing in a non-metallic tube. The ultrasonic flowmeter includes: a first ultrasonic element that transmits and receives an ultrasonic signal; a second ultrasonic element that transmits and receives an ultrasonic signal; a first wedge member in which a first surface opposing the first ultrasonic element and a second surface opposing an outer surface of the tube form a first angle, the first wedge member propagating the ultrasonic signal; a second wedge member in which a third surface opposing the second ultrasonic element and a fourth surface opposing the outer surface of the tube form a second angle, the second wedge member propagating the ultrasonic signal; a housing that accommodates the first ultrasonic element, the first wedge member, the second ultrasonic element, and the second wedge member; and a flow rate measurement unit that measures the flow rate of the gas flowing in the tube based on a propagation time difference of a longitudinal wave, excited in the tube, among the ultrasonic signals transmitted and received between the first ultrasonic element and the second ultrasonic element. The first angle of the first wedge member and the second angle of the second wedge member are configured such that the tube excites both a longitudinal wave and a shear wave, and a mixing ratio of the shear wave to the longitudinal wave is 10% or less.

That is, the tube excites both the longitudinal wave and the shear wave by the transmitted ultrasonic signals. Since a sound velocity is different between the longitudinal wave and the shear wave, a case where the longitudinal wave and the shear wave weaken each other to lower signal intensities so that it becomes difficult to measure the flow rate may be assumed. For this reason, it is desired to excite only one of the longitudinal wave and the shear wave for the measurement, but the signal intensity is higher in the longitudinal wave when the signal intensities of the longitudinal wave and the shear wave are compared.

In the present embodiment, the tube excites both the longitudinal wave and the shear wave, but the first angle of the first wedge member and the second angle of the second wedge member are set such that the mixing ratio of the shear wave to the longitudinal wave is 10% or less. When the mixing ratio of the shear wave exceeds 10%, the longitudinal wave and the shear wave tend to weaken each other. However, when the mixing ratio of the shear wave is 10% or less, the measurement using the longitudinal wave having a relatively high signal intensity becomes possible, so measurement accuracy is improved.

According to another embodiment of the disclosure, sound velocities of the first wedge member and the second wedge member of the ultrasonic flowmeter can be set to 1800 m/s or more and 2500 m/s or less. An angle formed by a surface of the first ultrasonic element that transmits and receives the ultrasonic signal and the outer surface of the tube, and an angle formed by a surface of the second ultrasonic element that transmits and receives the ultrasonic signal and the outer surface of the tube are 20 degrees or more and 40 degrees or less.

According to this configuration, since the angle formed between the surface of the ultrasonic element that transmits and receives the ultrasonic signal and the outer surface of the tube is 30 degrees or more and 40 degrees or less, the mixing ratio of the shear wave to the longitudinal wave becomes 10% or less when the tube excites both the longitudinal wave and the shear wave by the ultrasonic signal. This enables the measurement using the longitudinal wave having a relatively high signal intensity, and thus, the measurement accuracy is improved.

Further, a length of the surface of the first ultrasonic element that transmits and receives the ultrasonic signal and a length of the surface of the second ultrasonic element that transmits and receives the ultrasonic signal can be set to 30 mm or less. As a result, an operational effect obtained by setting the above-described angle range (20 degrees or more and 40 degrees or less) is sufficiently enhanced while avoiding an increase in a size of the housing, and the measurement using the longitudinal wave can be performed with high accuracy.

Further, the first ultrasonic element and the second ultrasonic element may be configured to transmit the ultrasonic signals of less than 2 MHz. As a result, it is possible to propagate the ultrasonic signal in a frequency domain suitable for the measurement of the flow rate of the gas flowing in the non-metallic tube.

Further, acoustic coupling members are interposed between the first wedge member and the outer surface of the tube and between the second wedge member and the outer surface of the tube, respectively, so that the ultrasonic signals transmitted from the respective ultrasonic elements are easily transmitted to the tube, and a stray signal can be suppressed.

Further, a support portion that supports the outer surface of the tube from a direction different from a direction in which the first wedge member and the second wedge member oppose each other may be provided. In this case, the first wedge member and the second wedge member are arranged so as to sandwich the tube from both sides in the radial direction, and the support portion may include a first support portion and a second support portion that support the tube from both sides in the radial direction. As a result, a relative position with respect to the first wedge member and the second wedge member can be appropriately set by forming a bent or crushed tube into a shape suitable for the measurement.

Further, a distance between the first wedge member and the second wedge member may be set to cause the tube to be pressed in the radial direction. In this case, a relief margin for releasing a part of the tube after deformation can be provided. The tube may be a resin tube made of any of nylon, Teflon (registered trademark), and polyurethane.

Further, the housing may include a first housing and a second housing that are arranged to sandwich the tube in the radial direction and coupled to each other. In this case, the first wedge member and the first ultrasonic element can be accommodated in the first housing, and the second wedge member and the second ultrasonic element can be accommodated in the second housing.

As described above, when the tube excites both the longitudinal wave and the shear wave, the flow rate of the gas flowing in the non-metallic tube can be accurately measured by using the longitudinal wave having a relatively high signal intensity.

DETAILED DESCRIPTION OF PREFERRED EMBODIMENTS

Hereinafter, an embodiment of the invention will be described in detail with reference to the drawings. Note that the following description of the preferred embodiment is merely an example in essence, and is not intended to limit the invention, its application, or its use.

First Embodiment

Figure 1:
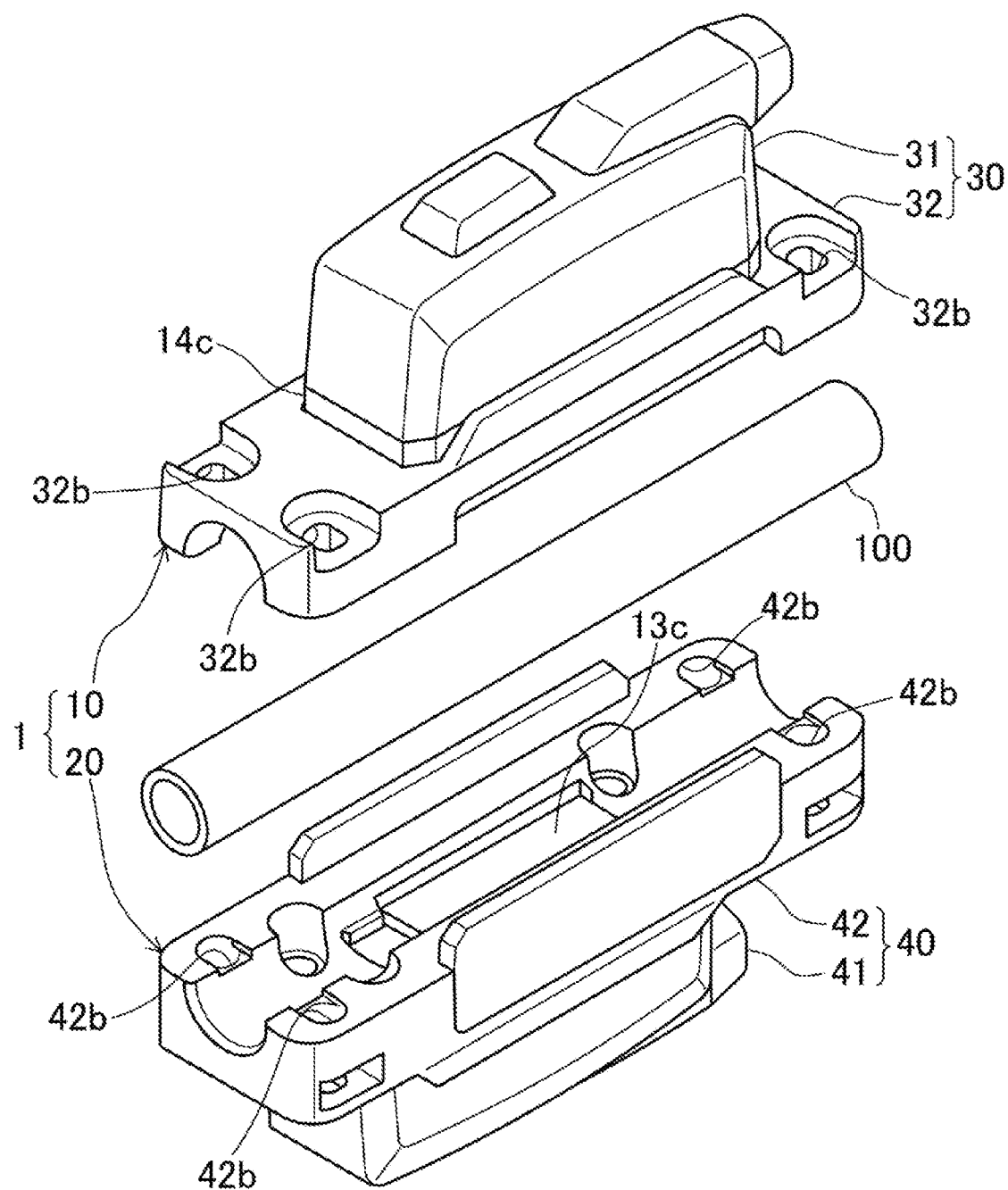
FIG. 1 is a perspective view illustrating a state before an ultrasonic flowmeter according to a first embodiment of the invention is attached to a tube.
Figure 2:
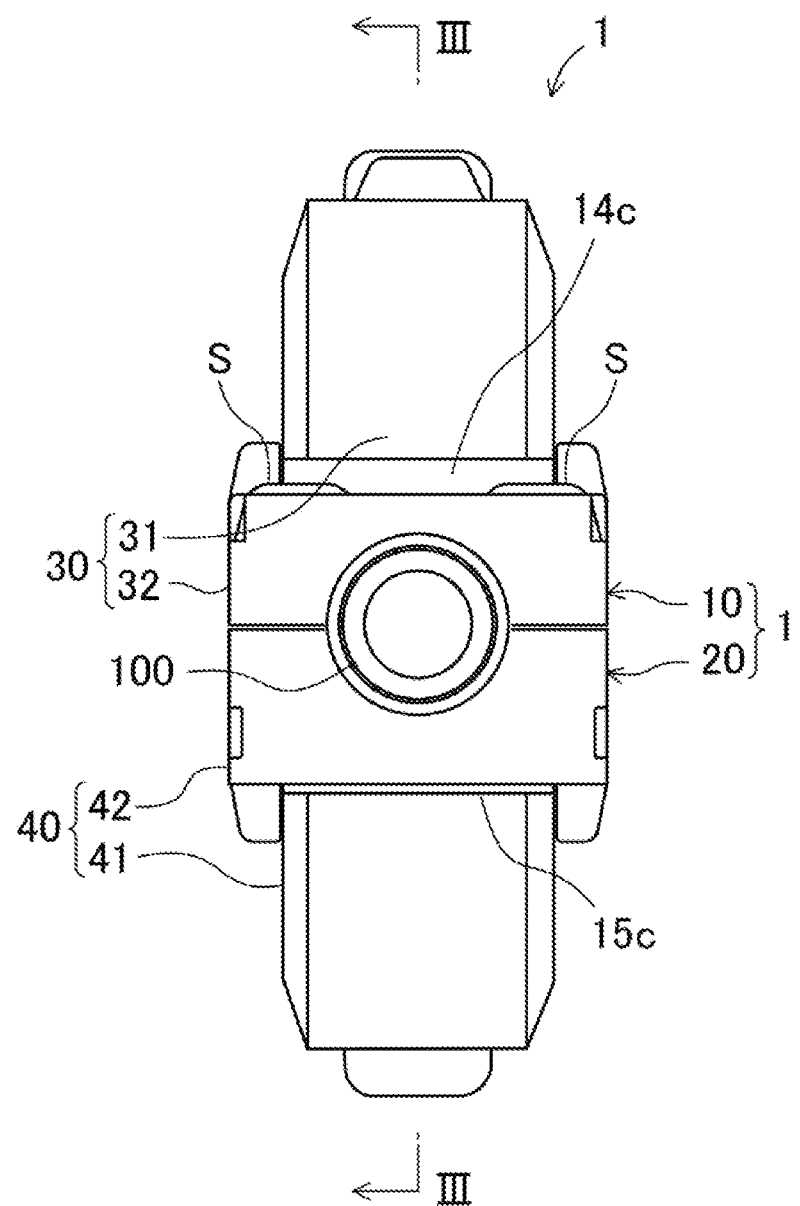
FIG. 2 is a sectional view of the ultrasonic flowmeter according to the first embodiment.
Figure 3:
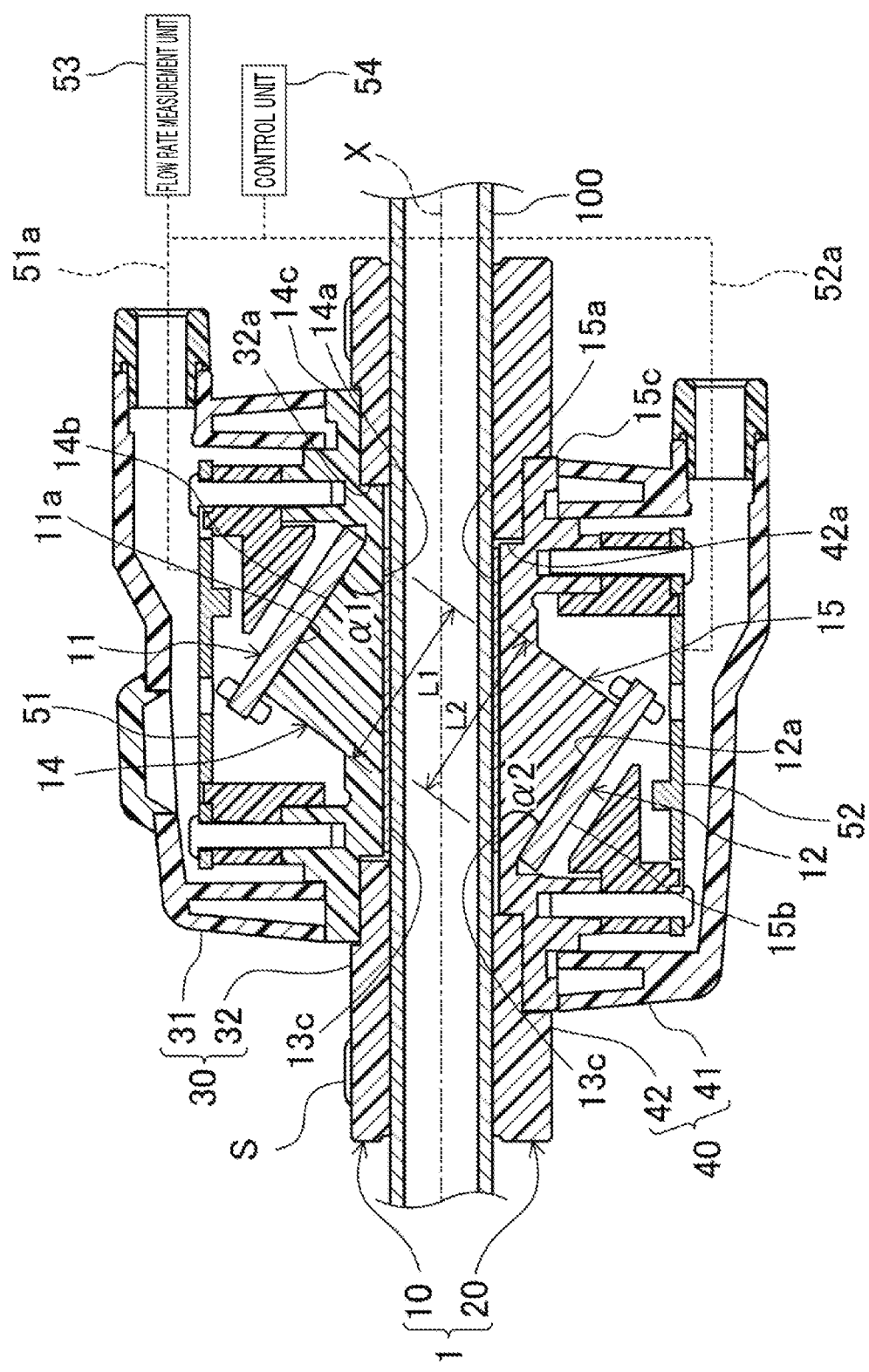
FIG. 3 is a sectional view taken along line III-III in FIG. 2.
Figure 4:
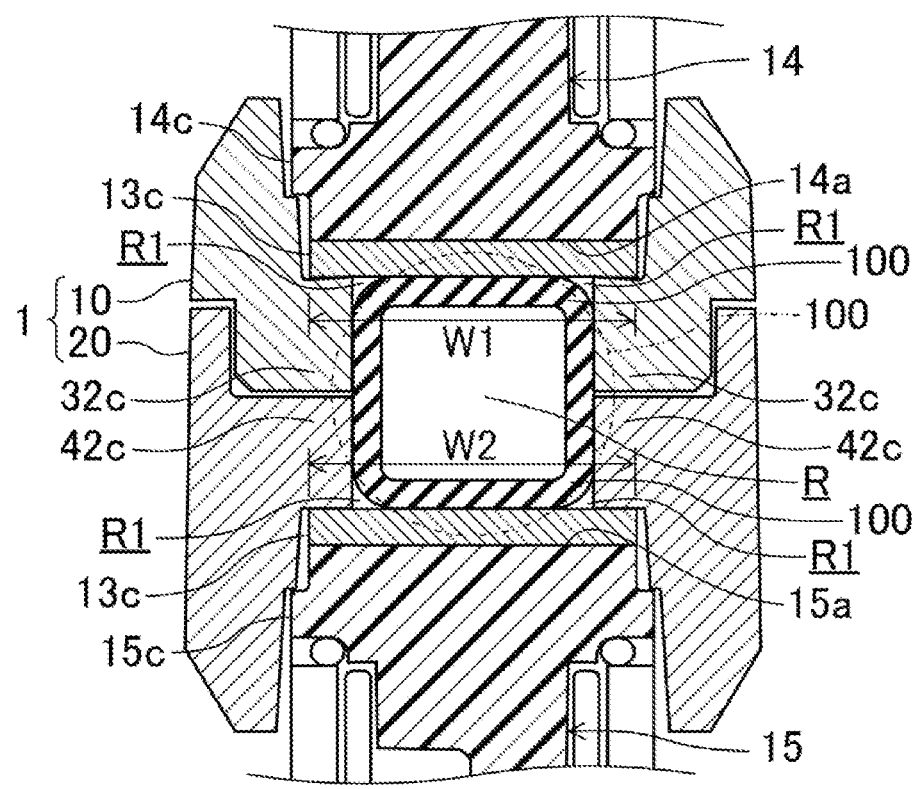
FIG. 4 is a sectional view illustrating a state of the tube to which the ultrasonic flowmeter is attached.

FIG. 1 illustrates a state before an ultrasonic flowmeter 1 according to a first embodiment of the invention is attached to a tube 100. FIGS. 2 to 4 illustrate a state in which the ultrasonic flowmeter 1 is attached to the tube 100.

The ultrasonic flowmeter 1 is configured to be able to measure flow rates of various gases including compressed air, for example. The ultrasonic flowmeter 1 can be incorporated in a pneumatic system (not illustrated) and used. The pneumatic system is roughly classified into a system for application of a drive system, a system for application of a discharge system, and a system for application of a suction system. The system for application of a drive system is a system that applies a force to a member using the pressure of compressed air, such as an air cylinder, a chuck, or a press-fitting machine. The system for application of a discharge system is used, for example, in blowing, purging, spraying of a paint or the like, seating, a leak test, and the like. The system for application of a suction system is used for, for example, suction and vacuuming.

The pneumatic system is provided with a tube 100 through which the compressed air, compressed by a compressor, flows. The tube 100 is a non-metallic tube made of a non-metallic material. Examples of the material thereof can include a resin material, and the resin tube 100 is obtained when the resin material is used. Examples of the resin material forming the tube 100 include nylon, Teflon, polyurethane, and the like, and any of these materials can be used. Further, an outer diameter of the tube 100 is set in a range of 3 mm or more and 20 mm or less. This tube 100 has such softness as to be easily handled, and can also be bent without crushing a flow path.

The tube 100 is provided with a speed controller, a throttle valve, and the like, and operation timing adjustment, adjustment of a blow rate, and the like of the air cylinder or the like are adjusted by the speed controller, an opening amount of the throttle valve based on an air pressure set by a regulator. In the present embodiment, the ultrasonic flowmeter 1 is attached to the tube 100 of the pneumatic system, and the ultrasonic flowmeter 1 measures a flow rate of a fluid flowing through the flow path in the tube 100 using an ultrasonic signal such that an operation of the pneumatic system can be managed based on the flow rate. The ultrasonic flowmeter 1 can also measure a flow rate of, for example, nitrogen, argon, or the like in addition to the compressed air. The fluid whose flow rate is measured by the ultrasonic flowmeter 1 can also be referred to as, for example, a target fluid or a fluid to be measured.

Hereinafter, a specific structure of the ultrasonic flowmeter 1 will be described. The ultrasonic flowmeter 1 is a clamp-on type flowmeter detachably attached to the tube 100, and includes a first divided body 10 and a second divided body 20 that can be separated from each other as illustrated in FIG. 1. As illustrated in FIGS. 2 to 4, the tube 100 is sandwiched from both sides in the radial direction by the first divided body 10 and the second divided body 20. Further, in the description of this embodiment, the "upstream" and the "downstream" are defined with a flow direction of the fluid in the tube 100 as a reference, but this definition is for convenience of description only, and does not limit the invention. Further, the upper side in FIG. 1 to 4 is referred to as the "up" of the ultrasonic flowmeter 1, and the lower side in FIG. 1 to 4 is referred to as the "down" of the ultrasonic flowmeter 1, but this is also for convenience of description only, and does not limit the invention.

As illustrated in FIG. 2, the ultrasonic flowmeter 1 includes a first ultrasonic element 11, a second ultrasonic element 12, a first wedge member 14, and a second wedge member 15. The first ultrasonic element 11 and the second ultrasonic element 12 both transmit and receive ultrasonic signals, and are configured by, for example, a piezoelectric element or the like and have a plate shape as a whole. The first ultrasonic element 11 is located on one side in the radial direction (the upper side in FIG. 3) outside the tube 100, and has a transmission/reception surface 11*a* that transmits and receives the ultrasonic signal. Further, the second ultrasonic element 12 is located on the other side in the radial direction (the lower side in FIG. 3) outside the tube 100, and has a transmission/reception surface 12*a* that transmits and receives the ultrasonic signal. A length L1 of the transmission/reception surface 11*a* of the first ultrasonic element 11 and a length L2 of the transmission/reception surface 12*a* of the second ultrasonic element 12 are both set to 30 mm or less. Further, a width W1 of the transmission/reception surface 11*a* of the first ultrasonic element 11 and a width W2 of the transmission/reception surface 12*a* of the second ultrasonic element 12 are both set to 20 mm or less as illustrated in FIG. 4.

The first wedge member 14 propagates the ultrasonic signal between the first ultrasonic element 11 and the tube 100, and is arranged between the first ultrasonic element 11 and the tube 100 outside the tube 100. The first wedge member 14 has a tube-side surface 14*a* opposing an outer surface of the tube 100 and an element-side surface 14*b* opposing the transmission/reception surface 11*a* of the first ultrasonic element 11. The first ultrasonic element 11 is provided on the first wedge member 14.

The tube-side surface 14*a* of the first wedge member 14 is configured by a surface extending in parallel with a pipe axis X of the tube 100. The element-side surface 14*b* of the first wedge member 14 is inclined by a predetermined angle with respect to the pipe axis X so as to be away from the pipe axis X of the tube 100 as proceeding toward the upstream side. Therefore, angles of the tube-side surface 14*a* and the element-side surface 14*b* of the first wedge member 14 with respect to the pipe axis X are different from each other, whereby the first wedge member 14 has a shape whose thickness dimension increases as proceeding toward the upstream side. The first wedge member 14 can be made of, for example, polyphenyl sulfone (PPSU), polyphenylene sulfide (PPS), or the like. As a result, the first wedge member 14 has a sound velocity of 1800 m/s or more and 2500 m/s or less.

The element-side surface 14*b* of the first wedge member 14 is a first surface, and the tube-side surface 14*a* of the first wedge member 14 is a second surface. The element-side surface 14*b* and the tube-side surface 14*a* form a first angle α1. Further, since the element-side surface 14*b* of the first wedge member 14 extends along the transmission/reception surface 11*a* of the first ultrasonic element 11 and the tube-side surface 14*a* of the first wedge member 14 extends along the outer surface of the tube 100, an angle formed between the transmission/reception surface 11*a* and the outer surface of the tube 100 when viewed from the side of the tube 100 is the first angle α1. Details of the first angle α1 will be described later.

An acoustic coupling member 13*c* is interposed between the tube-side surface 14*a* of the first wedge member 14 and the outer surface of the tube 100. The outer surface of the tube 100 is in contact with the acoustic coupling member 13*c*, and the tube-side surface 14*a* of the first wedge member 14 is in contact with the acoustic coupling member 13*c*. The acoustic coupling member 13*c* may be a member constituting a portion of the first wedge member 14 or a member constituting a portion of the tube 100. The acoustic coupling member 13*c* is made of, for example, a viscoelastic body made of rubber, grease, or the like. When the acoustic coupling member 13c is made of rubber, the acoustic coupling member can be made of cross-linked rubber, for example, butyl rubber (isobutyene-isoprene rubber (IR)), ethylene (ethylene-propylene rubber (EPDM)), nitrile rubber (NBR) (acrylonitrile-butadiene rubber (BR), fluororubber (FKM), epichlorohydrin rubber (ECO), norbornene rubber (NOR), or the like. Further, when the acoustic coupling member 13c is made of rubber, rubber molded into a sheet shape in advance can be used.

The second wedge member 15 propagates the ultrasonic signal between the second ultrasonic element 12 and the tube 100, and is arranged between the second ultrasonic element 12 and the tube 100 outside the tube 100. That is, the first wedge member 14 and the second wedge member 15 are arranged so as to sandwich the tube 100 from both sides in the radial direction.

As illustrated in FIG. 4, a distance between the first wedge member 14 and the second wedge member 15 is set to press the tube 100 in the radial direction. That is, a shape of the tube 100 when no external force is applied is indicated by an imaginary line. A distance between the tube-side surface 14a of the first wedge member 14 and the tube-side surface 15a of the second wedge member 15 is shorter than an outer diameter dimension of the tube 100 including the acoustic coupling member 13c, whereby the tube 100 to which the ultrasonic flowmeter 1 is attached is pressed in the radial direction and deformed.

The second wedge member 15 has a tube-side surface 15a opposing the outer surface of the tube 100 and an element-side surface 15b opposing the transmission/reception surface 12a of the second ultrasonic element 12. The second ultrasonic element 12 is provided on the second wedge member 15.

The tube-side surface 15a of the second wedge member 15 is configured by a surface extending in parallel with the pipe axis X of the tube 100. The element-side surface 15b of the second wedge member 15 is inclined by a predetermined angle with respect to the pipe axis X so as to be away from the pipe axis X of the tube 100 as proceeding toward the upstream side. Therefore, angles of the tube-side surface 15a and the element-side surface 15b of the second wedge member 15 with respect to the pipe axis X are different from each other, whereby the second wedge member 15 has a shape whose thickness dimension increases as proceeding toward the downstream side. The second wedge member 15 is made of the same material as the first wedge member 14, and thus, the second wedge member 15 has a sound velocity of 1800 m/s or more and 2500 m/s or less.

The element-side surface 15b of the second wedge member 15 is a third surface, and the tube-side surface 15a of the second wedge member 15 is a fourth surface. The element-side surface 15b and the tube-side surface 15a form a second angle α2. Further, since the element-side surface 15b of the second wedge member 15 extends along the transmission/reception surface 12a of the second ultrasonic element 12 and the tube-side surface 15a of the second wedge member 15 extends along the outer surface of the tube 100, an angle formed between the transmission/reception surface 12a and the outer surface of the tube 100 when viewed from the side of the tube 100 is the second angle α2. Details of the second angle α2 will be described later.

An acoustic coupling member 13c is interposed between the tube-side surface 15a of the second wedge member 15 and the outer surface of the tube 100. The outer surface of the tube 100 is in contact with the acoustic coupling member 13c, and the tube-side surface 15a of the second wedge member 15 is in contact with the acoustic coupling member 13c. The acoustic coupling member 13c may be a member constituting a portion of the second wedge member 15.

The first divided body 10 includes the first ultrasonic element 11, the first wedge member 14, and a first housing 30 that accommodates the first ultrasonic element 11 and the first wedge member 14. The first housing 30 includes a first box-shaped portion 31 and a first base portion 32. The first box-shaped portion 31 is opened downward and formed to be long in the length direction of the tube 100, and the first ultrasonic element 11 and the first wedge member 14 are arranged inside the first box-shaped portion 31. A first attachment plate portion 14c is provided at a peripheral edge portion of the first wedge member 14. The first attachment plate portion 14c is fixed to the first box-shaped portion 31 or the first base portion 32.

The first base portion 32 is arranged below the first box-shaped portion 31 and is integrated with the first box-shaped portion 31. As illustrated in FIG. 3, a first open port 32a is formed at the center of the first base portion 32, and the first open port 32a has a shape elongated in the length direction of the tube 100. The tube-side surface 14a of the first wedge member 14 is arranged so as to face downward through the first open port 32a. When the acoustic coupling member 13c adheres to the tube-side surface 14a, the acoustic coupling member 13c is arranged so as to face downward through the first open port 32a.

As illustrated in FIG. 1, both sides of the first base portion 32 in the longitudinal direction are formed so as to extend from the first box-shaped portion 31. Screw insertion holes 32b through which screws S only partially illustrated in FIG. 2 are inserted are formed on both the sides of the first base portion 32 in the longitudinal direction. Further, as illustrated in FIG. 4, the first base portion 32 is provided with a pair of upper support portions 32c supporting the outer surface of the tube 100 from a direction (the side) different from a direction (up-down direction) in which the first wedge member 14 and the second wedge member 15 oppose each other. The upper support portion 32c protrudes downward from a lower surface of the first base portion 32 and extends in the length direction of the tube 100. The upper support portion 32c located on the right side in FIG. 4 is defined as a first support portion, the upper support portion 32c located on the left side in FIG. 4 is defined as a second support portion, and the right and left upper support portions 32c support the tube 100 from both sides in the radial direction.

As illustrated in FIG. 3, the second divided body 20 includes the second ultrasonic element 12, the second wedge member 15, and a second housing 40 that accommodates the second ultrasonic element 12 and the second wedge member 15. In the present embodiment, a housing includes the first housing 30 and the second housing 40. The second housing 40 includes a second box-shaped portion 41 and a second base portion 42. The second box-shaped portion 41 is opened upward and formed to be long in the length direction of the tube 100, and the second ultrasonic element 12 and the second wedge member 15 are arranged inside the second box-shaped portion 41. A second attachment plate portion 15c is provided at a peripheral edge portion of the second wedge member 15. The second attachment plate portion 15c is fixed to the second box-shaped portion 41 or the second base portion 42.

The second base portion 42 is arranged above the second box-shaped portion 41 and is integrated with the second box-shaped portion 41. As illustrated in FIG. 3, a second open port 42a is formed at the center of the second base portion 42, and the second open port 42a has a shape elongated in the length direction of the tube 100. The tube-side surface 15a of the second wedge member 15 is arranged so as to face upward through the second open port 42a. When the acoustic coupling member 13c adheres to the tube-side surface 15a, the acoustic coupling member 13c is arranged so as to face upward through the second open port 42a.

As illustrated in FIG. 1, both sides of the second base portion 42 in the longitudinal direction are formed so as to extend from the second box-shaped portion 41. Screw insertion holes 42b through which the screws S that has been inserted into the screw insertion holes 32b of the first base portion 32 are inserted are formed on both the sides of the second base portion 42 in the longitudinal direction. Nuts (not illustrated) are screwed to the screws S inserted into the screw insertion holes 42b.

Further, as illustrated in FIG. 4, the second base portion 42 is provided with a pair of lower support portions 42c supporting the outer surface of the tube 100 from a direction (the side) different from the direction (up-down direction) in which the first wedge member 14 and the second wedge member 15 oppose each other. The lower support portions 42c are arranged in the same manner as the upper support portions 32c. The lower support portion 42c located on the right side in FIG. 4 is defined as a first support portion, the lower support portion 42c located on the left side in FIG. 4 is defined as a second support portion, and the right and left lower support portions 42c support the tube 100 from both sides in the radial direction together with the upper support portions 32c.

A distance between the right upper support portion 32c and the left upper support portion 32c is set to be narrower than the outer diameter of the tube 100. Further, similarly, a distance between the right lower support portion 42c and the left lower support portion 42c is also set to be narrower than the outer diameter of the tube 100. As a result, the tube 100 is pressed in the radial direction and deformed by the right and left upper support portions 32c and the right and left lower support portions 42c.

As illustrated in FIG. 4, the first housing 30 and the second housing 40 of the ultrasonic flowmeter 1 are arranged so as to sandwich the tube 100 in the radial direction, and are coupled to each other by the screws S (illustrated in FIG. 2). Therefore, a space R for arranging the tube 100 is formed in a state where the first housing 30 and the second housing 40 are coupled to each other. The space R is a space surrounded by the first wedge member 14, the second wedge member 15, the upper support portions 32c, and the lower support portions 42c. The tube 100 arranged in the space R is pressed in the up-down direction and the left-right direction and deformed as described above. Each of four corners R1 of the space R is a relief margin for releasing a portion of the tube 100 after deformation.

Figure 5A:
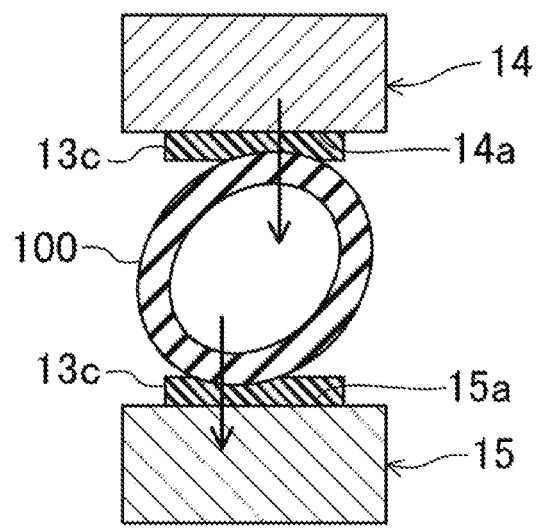
FIGS. 5A and 5B are views for comparing sectional shapes of the tube to which the ultrasonic flowmeter is attached, FIG. 5A illustrating a case where there is no support portion, and FIG. 5B illustrating a case where there is a support portion.
Figure 5B:
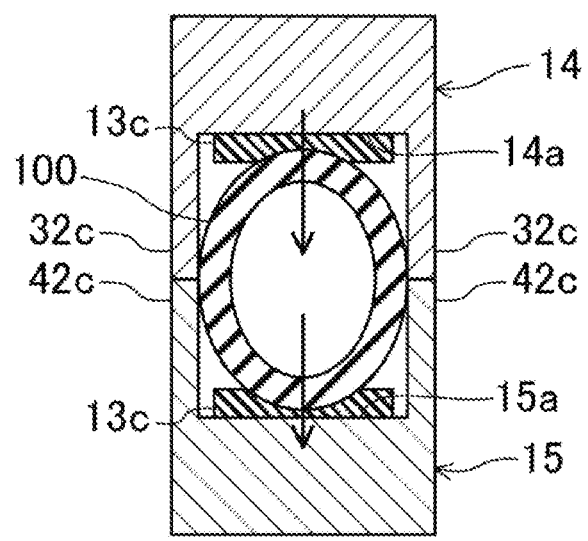

FIGS. 5A and 5B are views for comparing sectional shapes of the tube 100 to which the ultrasonic flowmeter 1 is attached. FIG. 5A illustrates a case where the upper support portions 32c and the lower support portions 42c are not provided, and FIG. 5B illustrates a case where the upper support portions 32c and the lower support portions 42c are provided. As illustrated in FIG. 5A, if the upper support portions 32c and the lower support portions 42c are not provided, the tube 100 subjected to a pressing force in the up-down direction has a shape close to an elliptical shape having a long diameter in the oblique direction, and has a distort shape in which an upper part of the tube 100 is in strong contact with a right area of the first wedge member 14 and a lower portion of the tube 100 is in strong contact with a left area of the second wedge member 15. Then, for example, it is difficult for the second ultrasonic element 12 to receive the ultrasonic signal transmitted from the first ultrasonic element 11, which may adversely affect measurement accuracy. On the other hand, when the upper support portion 32c and the lower support portion 42c are provided as illustrated in FIG. 5B, the tube 100 has a bilaterally symmetrical shape and a vertically symmetrical shape. For example, the ultrasonic signal transmitted from the first ultrasonic element 11 can be reliably received by the second ultrasonic element 12, and as a result, the measurement accuracy can be enhanced.

As illustrated in FIG. 3, the ultrasonic flowmeter 1 further includes a first circuit board 51 accommodated in the first housing 30 and a second circuit board 52 accommodated in the second housing 40. The first circuit board 51 is arranged so as to cover the first ultrasonic element 11, and is connected to the first ultrasonic element 11. The second circuit board 52 is arranged so as to cover the second ultrasonic element 12, and is connected to the second ultrasonic element 12.

The ultrasonic flowmeter 1 also includes a flow rate measurement unit 53 and a control unit 54. The flow rate measurement unit 53 and the control unit 54 are connected to the first circuit board 51 via a first signal line 51a, and are connected to the second circuit board 52 via a second signal line 52a. The first ultrasonic element 11 and the second ultrasonic element 12 are controlled by the control unit 54. Specifically, the first ultrasonic element 11 and the second ultrasonic element 12 are configured to transmit an ultrasonic signal of less than 2 MHz, and the transmission of the ultrasonic signal of this frequency can be performed by hardware configurations of the first ultrasonic element 11 and the second ultrasonic element 12 and hardware control by the control unit 54.

Further, the ultrasonic signals received by the first ultrasonic element 11 and the second ultrasonic element 12 are transmitted to the flow rate measurement unit 53 via the first signal line 51a and the second signal line 52a, respectively. Note that the flow rate measurement unit 53 and the control unit 54 may be provided on the first circuit board 51 or the second circuit board 52.

The flow rate measurement unit 53 is configured by, for example, a microcomputer or the like, and is a part that measures a flow rate of a gas in the tube 100 based on a propagation time difference of a longitudinal wave excited by the tube 100, among the ultrasonic signals transmitted and received between the first ultrasonic element 11 and the second ultrasonic element 12. The flow rate measurement unit 53 is a propagation time difference type measurement unit, and more specifically, the ultrasonic signals transmitted and received between the first ultrasonic element 11 and the second ultrasonic element 12 are input to the flow rate measurement unit 53.

Since the first ultrasonic element 11 and the second ultrasonic element 12 are inclined with respect to the pipe axis X of the tube 100, an ultrasonic wave obliquely passes through the fluid flowing in the tube 100. The first ultrasonic element 11 transmits the ultrasonic signal in a direction opposite to the flow, and the second ultrasonic element 12 transmits the ultrasonic signal in a direction along the flow of the fluid. Since the ultrasonic signals are transmitted and detected in the direction along the flow of the fluid and the direction opposite to the flow, respectively, in this manner, a difference in propagation time of the ultrasonic signal is generated between the direction along the flow of the fluid and the direction opposite to the flow.

For example, the first ultrasonic element 11 and the second ultrasonic element 12 intermittently emit, for example, a burst wave ultrasonic signal (signal in which ultrasonic pulses on the order of several MHz form, for example, about ten clumps), and reception waveforms are sampled at a high speed by an A/D converter of the flow rate measurement unit 53. The flow rate measurement unit 53 aligns a forward reception waveform and a backward reception waveform with each time at a time point of emission as the origin, performs matching between waveform shapes while relatively shifting the waveforms in the time direction from the state, and determines a time shift amount at which the matching degree is maximum as a propagation time difference. The flow rate measurement unit 53 calculates the flow velocity and the flow rate from the determined propagation time difference. The flow rate calculated by the flow rate measurement unit 53 may be an instantaneous flow rate or an integrated flow rate.

(First Angle and Second Angle)

The first angle α1 of the first wedge member 14 is the angle formed by the element-side surface 14b and the tube-side surface 14a, and the second angle α2 of the second wedge member 15 is the angle formed by the element-side surface 15b and the tube-side surface 15a. The first angle α1 and the second angle α2 are configured such that the tube 100 that has received an input of an ultrasonic signal excites both a longitudinal wave and a shear wave, and a mixing ratio of the shear wave to the longitudinal wave excited by the tube 100 is 10% or less. That is, when the tube 100 that has received the input of the ultrasonic signal excites both the longitudinal wave and the shear wave, the longitudinal wave and the shear wave sometimes interfere with and weaken each other at a time point of reception by a reception-side element since a sound velocity of the longitudinal wave and a sound velocity of the shear wave are different. In this manner, measurement stability is affected if both the waves are mixed, and thus, it is desired to excite only one of the waves. However, the shear wave has a lower intensity than the longitudinal wave, and thus, it is desired to perform stable measurement using the longitudinal wave having a higher signal intensity.

Here, if the mixing ratio of the shear wave to the longitudinal wave exceeds 10%, the ultrasonic signal received by the reception-side element is likely to be weakened, or the proportion of the longitudinal wave having a high intensity decreases, so that the measurement becomes unstable. On the other hand, in the present embodiment, the mixing ratio of the shear wave to the longitudinal wave is 10% or less, and thus, the ultrasonic signal received by the reception-side element is not weakened, and the stable measurement can be performed using the longitudinal wave having a high signal intensity. When the mixing ratio of the shear wave to the longitudinal wave is 9% or less or 8% or less, the measurement can be performed more stably.

Figure 6:
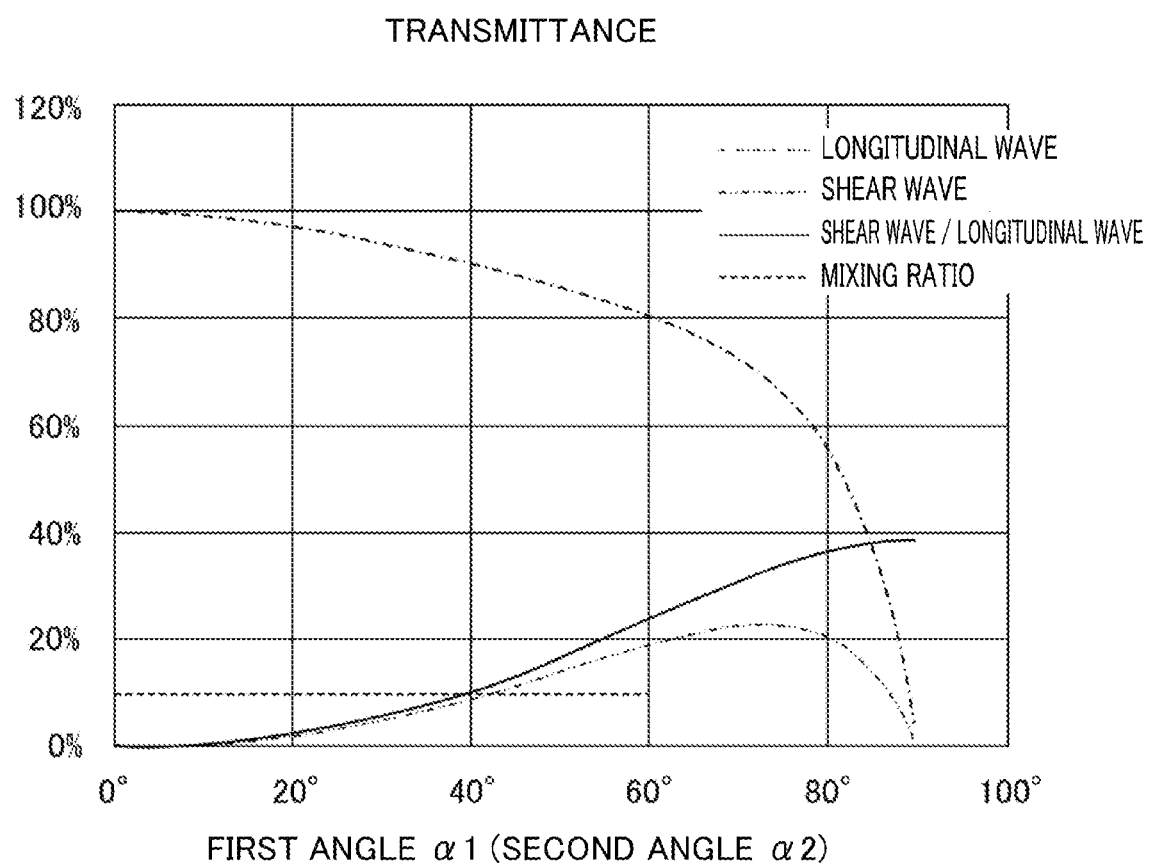
FIG. 6 is a graph illustrating transmittances of a longitudinal wave and a shear wave.

FIG. 6 is a graph illustrating a transmittance of the longitudinal wave (indicated by a one-dot chain line), a transmittance of the shear wave (indicated by a two-dot chain line), and the transmittance of the shear wave/the transmittance of the longitudinal wave (indicated by a solid line). The vertical axis represents the transmittance, and the horizontal axis represents the first angle α1 or the second angle α2. The transmittance of the longitudinal wave and the transmittance of the shear wave depend on the first angle α1 or the second angle α2, and can be calculated by, for example, the Zoeppritz equations.

As is clear from this graph, the first angle α1 or the second angle α2 is 40 degrees or less in order to set the mixing ratio of the shear wave to the longitudinal wave to 10% or less. In short, the stable measurement can be performed using the longitudinal wave having a high signal intensity by setting the first angle α1 or the second angle α2 to 40 degrees or less. That is, when the tube 100 has excited both the longitudinal wave and the shear wave, the flow rate can be accurately measured using the longitudinal wave having a relatively high signal intensity.

Figure 7A:
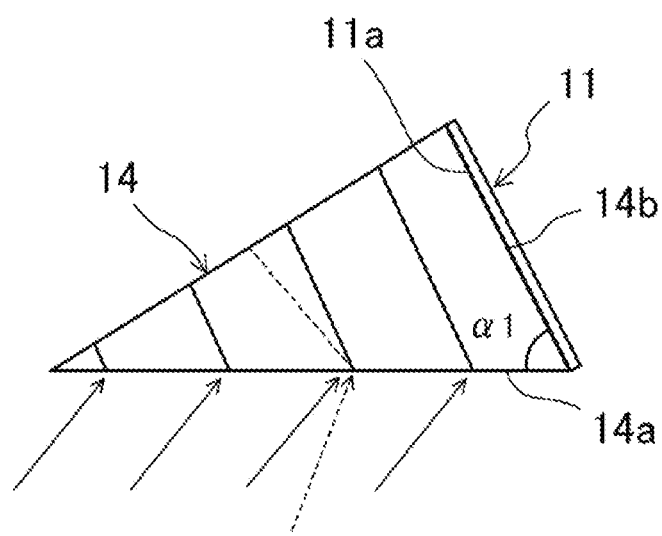
FIGS. 7A and 7B are views for describing a difference in a directional filter characteristic depending on an angle of a wedge member, FIG. 7A illustrating a case where the angle is large, and FIG. 7B illustrating a case where the angle is small.
Figure 7B:
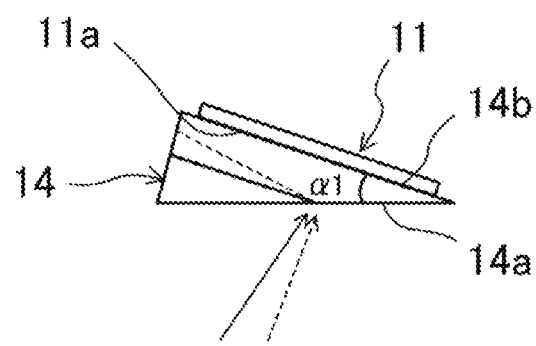

Further, FIGS. 7A and 7B are views for describing a difference in a directional filter characteristic depending on the first angle α1 or the second angle α2. The larger the first angle α1 or the second angle α2, the stronger the directional filter characteristic of the first wedge member 14 or the second wedge member 15. Conversely, the smaller the first angle α1 or the second angle α2, the weaker the directional filter characteristic of the first wedge member 14 or the second wedge member 15. In FIGS. 7A and 7B, a solid arrow indicates an intended traverse line angle, and a broken arrow indicates an unintended traverse angle. When the directional filter characteristic is small, a large number of ultrasonic signals propagated from courses other than an intended measurement course are included in measurement signals, which causes deterioration in the measurement accuracy. In the present embodiment, the first angle α1 or the second angle α2 is set to 20 degrees or more, and as a result, ultrasonic signals propagated from courses other than the intended measurement course are less likely to be included in measurement signals, and the measurement accuracy is improved. When the first angle α1 or the second angle α2 is set to 25 degrees or more or to 30 degrees or more, the directional filter characteristic is larger, and the measurement accuracy can be further improved.

The directional filter characteristic of the first wedge member 14 or the second wedge member 15 is determined by a size of the first ultrasonic element 11 or the second ultrasonic element 12, the sound velocity of the first wedge member 14 or the second wedge member 15, the first angle α1 or the second angle α2, the frequency of the ultrasonic signal. In the present embodiment, the length L1 of the first ultrasonic element 11 or the length L2 of the second ultrasonic element 12 is set to 30 mm or less, the sound velocity of the first wedge member 14 or the second wedge member 15 is set to 1800 m/sec or more and 2500 m/sec or less, and the frequency of the ultrasonic signal is set to 2 MHz or less. A lower limit of the length L1 of the first ultrasonic element 11 or the length L2 of the second ultrasonic element 12 can be set to, for example, 10 mm or more. A lower limit of the frequency of the ultrasonic signal can be set to 1 MHz or more. Within this range, the first angle α1 or the second angle α2 is preferably 20 degrees or more.

Figure 8:
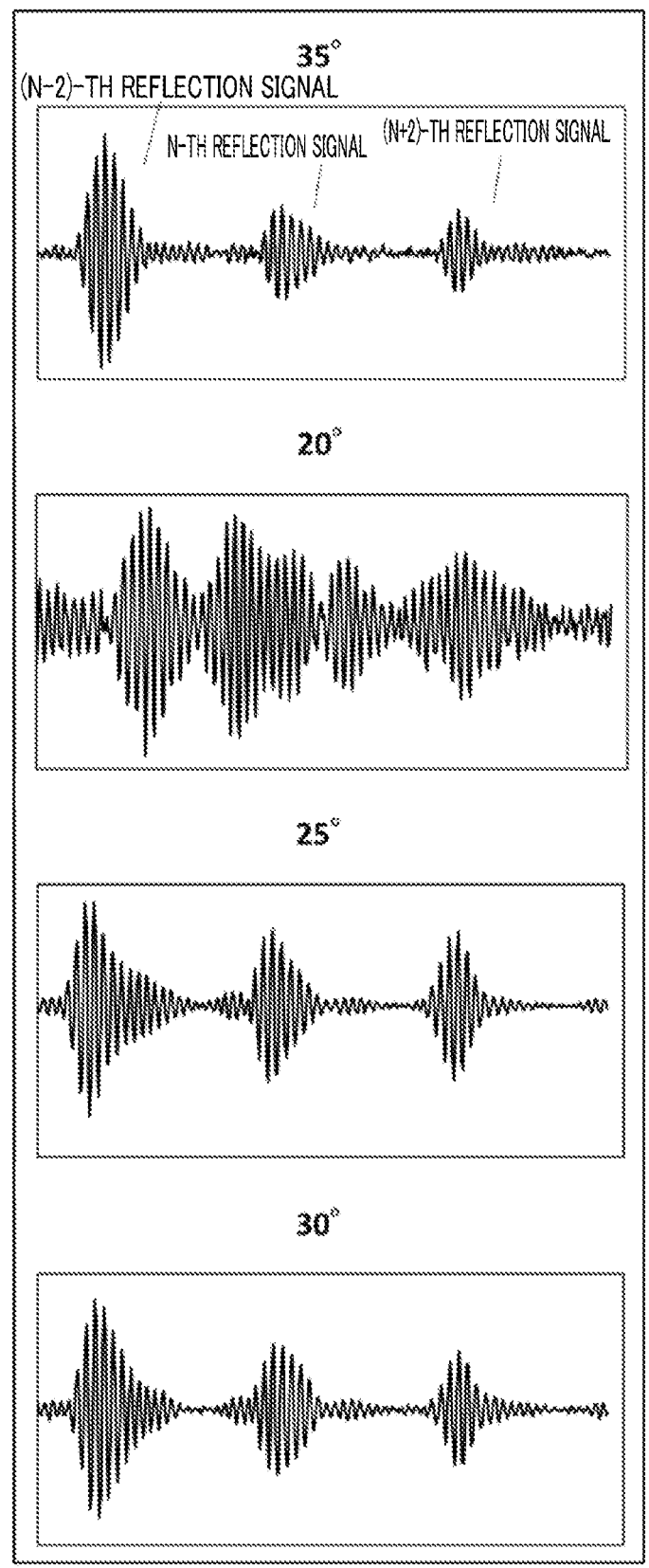
FIG. 8 is a view illustrating examples of ultrasonic signals received by a reception-side element.

The directional filter characteristic is improved as the length L1 of the first ultrasonic element 11 or the length L2 of the second ultrasonic element 12 is longer. However, a size of the ultrasonic flowmeter 1 is also increased to limit an application range, and thus, the length L1 of the first ultrasonic element 11 or the length L2 of the second ultrasonic element 12 is preferably 30 mm or less. Further, the directional filter characteristic is improved as the sound velocity of the first wedge member 14 or the second wedge member 15 is slower, but reliability of a measurement result deteriorates, and thus, the sound velocity is preferably 1800 m/sec or more. Further, the directional filter characteristic is improved as the frequency of the ultrasonic signal is higher, but attenuation in the gas increases, and thus, the frequency is preferably less than 2 MHz. FIG. 8 is a view illustrating examples of ultrasonic signals received by the reception-side element, and illustrates a case where the first angle α1 or the second angle α2 is 35 degrees, a case where the first angle α1 or the second angle α2 is 20 degrees, a case where the first angle α1 or the second angle α2 is 25 degrees, and a case where the first angle α1 or the second angle α2 is 30 degrees. As is clear from this view, a plurality of reflection signals can be received in a clearly distinguishable form in the cases of 35 degrees, 30 degrees, and 25 degrees, but it tends to be difficult to distinguish a plurality of reflection signals in the case of 20 degrees. From this point, a lower limit of the first angle α1 or the second angle α2 is preferably 20 degrees or more.

Second Embodiment

FIGS. 9 to 12 illustrate an ultrasonic flowmeter 1 according to a second embodiment of the invention. The second embodiment is different from the clamp-on type of the first embodiment in that a built-in tube 13 is provided. Hereinafter, the same parts as those in the first embodiment will be denoted by the same reference signs and will not be described, and different parts will be described in detail.

Figure 9:
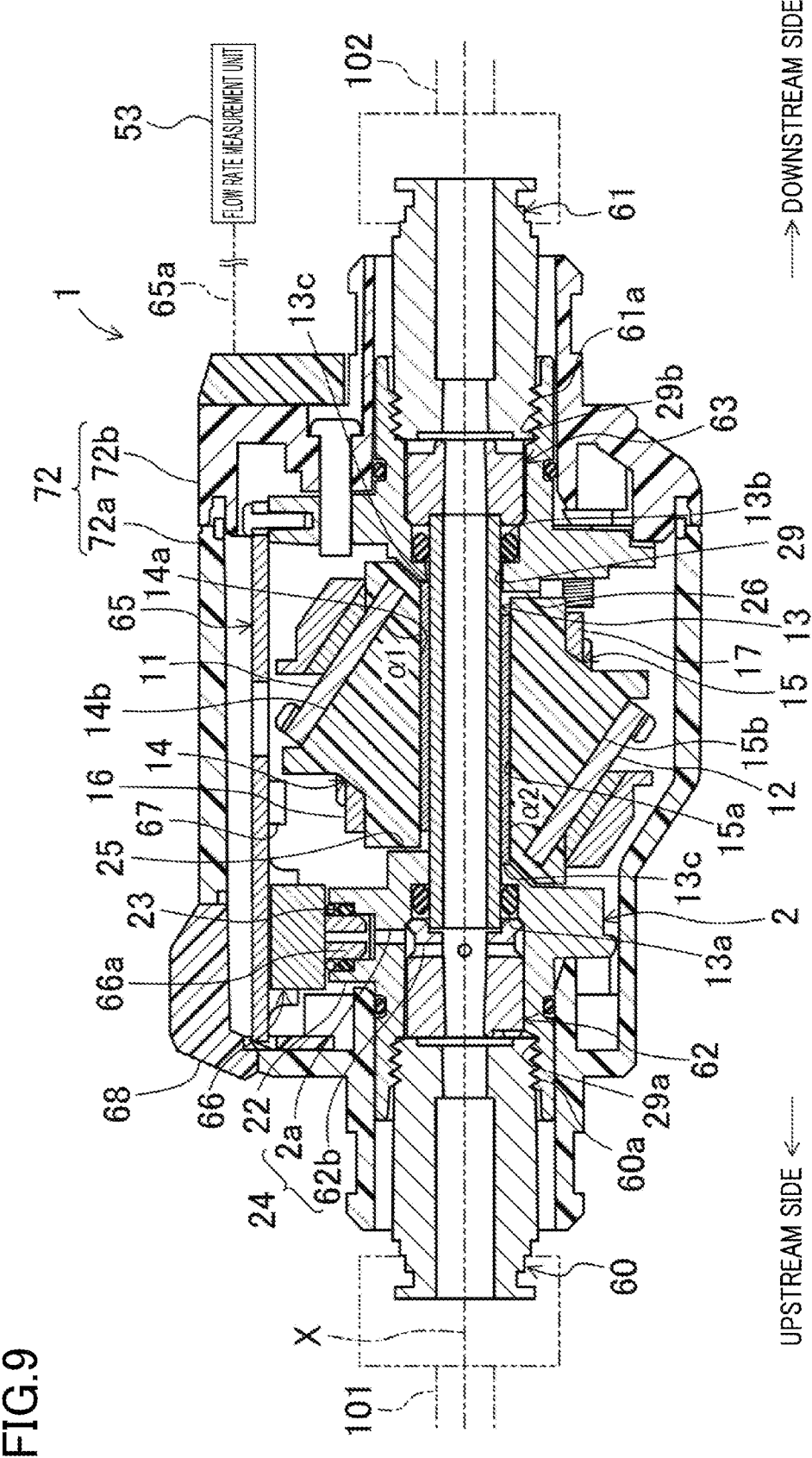
FIG. 9 is a view according to a second embodiment of the invention, which corresponds to FIG. 3.

As illustrated in FIG. 9, the ultrasonic flowmeter 1 according to the second embodiment includes the built-in tube 13 that is provided between the upstream external pipe 101 and the downstream external pipe 102. The upstream external pipe 101 is an external pipe located upstream of the ultrasonic flowmeter 1, and the downstream external pipe 102 is an external pipe located downstream of the ultrasonic flowmeter 1. The upstream external pipe 101 and the downstream external pipe 102 are made of the same material as the tube 100.

When the ultrasonic flowmeter 1 is attached to the pneumatic system, a portion of an existing pipe is cut, and then, the ultrasonic flowmeter 1 can be installed between the upstream external pipe 101 and the downstream external pipe 102 with an upstream side of the cut portion as the upstream external pipe 101 and a downstream side of the cut portion as the downstream external pipe 102. That is, the ultrasonic flowmeter 1 can be installed by cutting the existing pipe. Note that the ultrasonic flowmeter 1 can also be incorporated in a pneumatic system when the pneumatic system is newly installed.

The built-in tube 13 defines a flow path through which a target fluid flows, is made of a member that attenuates the ultrasonic signals transmitted from the first ultrasonic element 11 and the second ultrasonic element 12, and can also be referred to as a damping pipe. Specifically, the built-in tube 13 is made of, for example, nylon, Teflon, polyurethane, or the like as a material having an ultrasonic signal attenuation capacity, and is made of a material softer than materials forming the first wedge member 14 and the second wedge member 15.

An inner surface and an outer surface of a part of the built-in tube 13 through which the ultrasonic signals pass are configured by smooth surfaces having no unevenness. In the present embodiment, the inner surface and the outer surface are the smooth surfaces over the entire length direction of the built-in tube 13, the ultrasonic signals transmitted from the first ultrasonic element 11 and the second ultrasonic element 12 are transmitted as intended. Further, a member (for example, a mesh, a filter, or the like) existing in a direction intersecting a flow direction of the fluid is not provided in the flow path of the built-in tube 13. That is, the built-in tube 13 is configured by a circular pipe member having a flow path completely penetrating therethrough from an upstream end to a downstream end. Further, since the inner surface of the built-in tube 13 is configured by the smooth surface, dirt is less likely to accumulate on the inner surface of the built-in tube 13. Note that an outer diameter of the built-in tube 13 can be set in a range of, for example, 3 mm or more and 20 mm or less.

The first ultrasonic element 11 and the second ultrasonic element 12 are located outside the built-in tube 13. The first wedge member 14 is arranged between the first ultrasonic element 11 and the built-in tube 13. The acoustic coupling member 13c is interposed between the built-in tube 13 and the first wedge member 14. An outer surface of the built-in tube 13 is in contact with the acoustic coupling member 13c. The acoustic coupling member 13c may be a member constituting a portion of the built-in tube 13.

The second wedge member 15 is arranged between the second ultrasonic element 12 and the built-in tube 13. Therefore, the flow rate of the target fluid is measured during the flow through the flow path of the built-in tube 13. The acoustic coupling member 13c is also interposed between the built-in tube 13 and the second wedge member 15.

The ultrasonic flowmeter 1 further includes a center block 2 having a shape elongated in the flow direction of the target fluid. The center block 2 is made of a highly rigid member such as metal or hard resin. Therefore, the built-in tube 13 is made of a material softer than a material forming the center block 2, and has a higher ultrasonic signal attenuation capacity than the material forming the center block 2.

In the center block 2, an insertion hole 29 into which the built-in tube 13 is inserted is formed to penetrate in the flow direction of the fluid. An upstream part and a downstream part of the built-in tube 13 are fixed to the center block 2 in a state of being inserted into the insertion hole 29. Further, the first wedge member 14 and the second wedge member 15 are also fixed to the center block 2.

Figure 10:
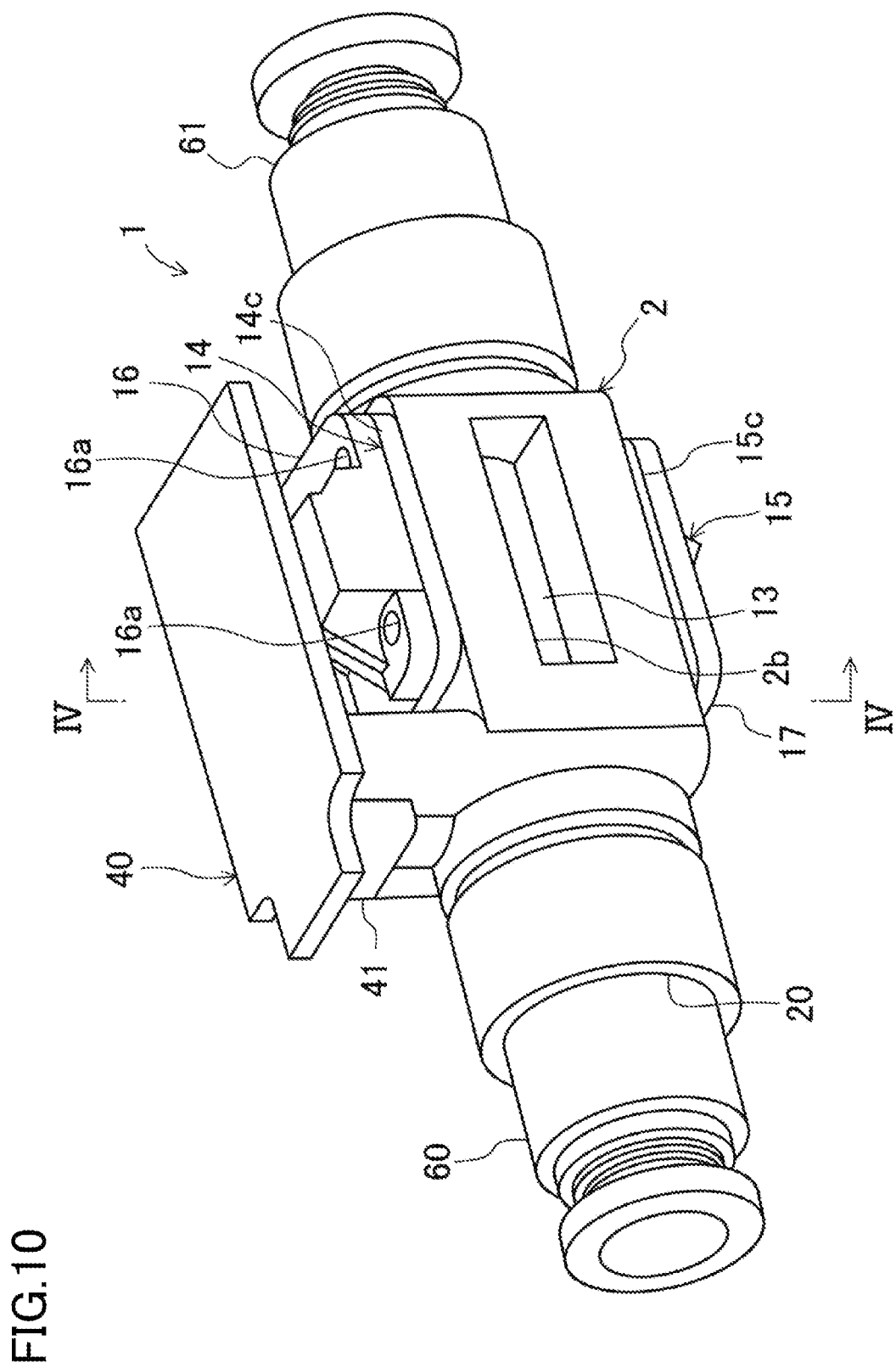
FIG. 10 is a perspective view illustrating a state in which a housing of the ultrasonic flowmeter according to second embodiment is omitted.

Specifically, a first opening 25 into which the first wedge member 14 on the built-in tube 13 side is inserted is formed in the center block 2. As illustrated in FIG. 10, a first flange portion 14c superimposed on an outer surface of the center block 2 is formed on the first wedge member 14. A first holder 16 is superimposed on the first flange portion 14c. A screw insertion hole 16a through which a fixing screw (not illustrated) is inserted is formed in the first holder 16. The screw inserted into the screw insertion hole 16a penetrates through the first flange portion 14c of the first wedge member 14 and is screwed into the center block 2. As a result, the first wedge member 14 is fastened and fixed to the center block 2. Further, the first ultrasonic element 11 is pressed against the first wedge member 14 by the first holder 16 as illustrated in FIG. 9.

Further, a second opening 26 into which the second wedge member 15 on the built-in tube 13 side is inserted is formed in the center block 2. As illustrated in FIG. 10, a second flange portion 15c superimposed on the outer surface of the center block 2 is formed on the second wedge member 15. The second holder 17 is superimposed on the second flange portion 15c. A screw insertion hole (not illustrated) through which a fixing screw (not illustrated) is inserted is formed in second holder 17. Therefore, similarly to the first wedge member 14, the second wedge member 15 can be fastened and fixed to the center block 2. Further, the second ultrasonic element 12 is pressed against the second wedge member 15 by the second holder 17 as illustrated in FIG. 9.

The ultrasonic flowmeter 1 further includes an upstream connection portion 60, a downstream connection portion 61, an upstream pipeline member 62, and a downstream pipeline member 63. The upstream connection portion 60, the upstream pipeline member 62, the built-in tube 13, the downstream pipeline member 63, and the downstream connection portion 61 are arranged so as to be sequentially located on the same straight line from the upstream side to the downstream side in the fluid flow direction. This straight line is a straight line formed by a pipe axis X of the built-in tube 13 and an extension line thereof. Note that the upstream pipeline member 62 and the downstream pipeline member 63 are provided as necessary, and may be omitted.

An upstream pipe sealing member 13a and a downstream pipe sealing member 13b, which are O-rings, are provided in close contact with outer surfaces of the upstream part and the downstream part of the built-in tube 13, respectively. The upstream pipe sealing member 13a is in close contact with an inner surface on the upstream side of the insertion hole 29, and a space between the upstream part of the built-in tube 13 and the insertion hole 29 is sealed by the upstream pipe sealing member 13a. Further, the downstream pipe sealing member 13b is in close contact with an inner surface on the downstream side of the insertion hole 29, and a space between the downstream part of the built-in tube 13 and the insertion hole 29 is sealed by the downstream pipe sealing member 13b.

Figure 11:
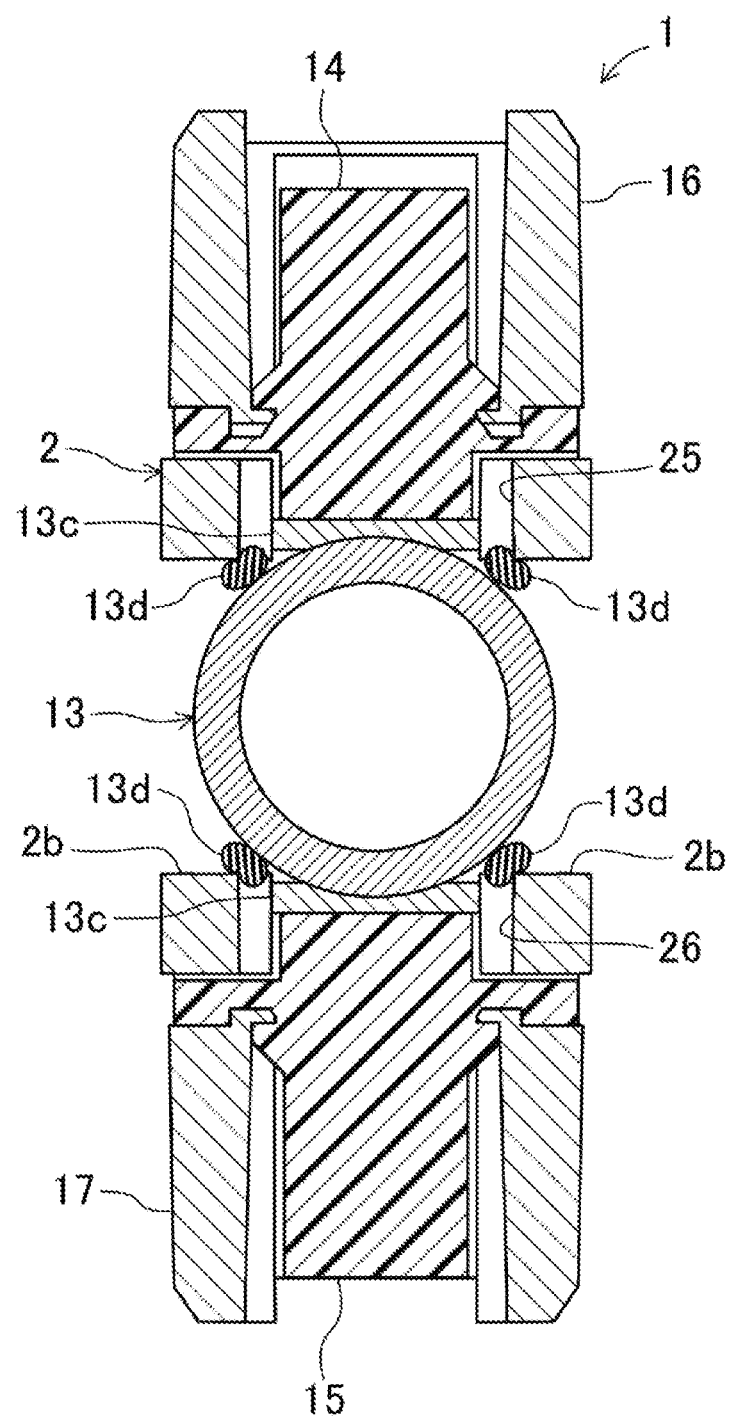
FIG. 11 is a view according to the second embodiment, which corresponds to FIG. 4.

As illustrated in FIGS. 10 and 11, side surface openings 2b are formed in both side surfaces of the center block 2. The side surface opening 2b has a shape elongated in the longitudinal direction of the center block 2. The side surface opening 2b opens the insertion hole 29 to the side. Therefore, a portion of the built-in tube 13 is visible from the side surface opening 2b. Grease 13d can be applied from the side surface openings 2b. The grease 13d is grease that attenuates the ultrasonic signal, and is applied so as to be interposed between the center block 2 and the built-in tube 13. As a result, a sound wave in the built-in tube 13 can be further attenuated.

The upstream connection portion 60 is a member for connection with the upstream external pipe 101 so as to make a flow path of the upstream external pipe 101 and the flow path of the built-in tube 13 communicate with each other. For example, a screw thread 60a is formed on an outer peripheral surface on the downstream side of the upstream connection portion 60. The screw thread 60a is screwed into a screw groove 29a formed on an inner peripheral surface on the upstream side of the insertion hole 29 of the center block 2, so that the upstream connection portion 60 is airtightly connected to the center block 2.

The upstream connection portion 60 is a member constituting a connection structure called one-touch fitting, tube fitting, or the like, and can connect or disconnect the upstream external pipe 101 without one-touch operation, that is, without using a tool or the like. A configuration of the upstream connection portion 60 is not limited to the above-described configuration, and various fitting structures can be adopted. Further, a shape of the upstream connection portion 60 can also be freely set.

The downstream connection portion 61 is a member for connection with the downstream external pipe 102 so as to make a flow path of the downstream external pipe 102 and the downstream side of the flow path of the built-in tube 13 communicate with each other. The downstream connection portion 61 is configured similarly to the upstream connection portion 60, and is configured such that the downstream connection portion 61 is airtightly connected to the center block 2 by screwing a screw thread 61a formed on an outer peripheral surface on the downstream side into a screw groove 29b formed on an inner peripheral surface on the downstream side of the insertion hole 29 of the center block 2. The upstream connection portion 60 and the downstream connection portion 61 can be fixed to the center block 2 using a fixing structure other than screws.

The upstream pipeline member 62 is provided between the built-in tube 13 and the upstream connection portion 60 and is a member that makes the flow path of the built-in tube 13 and the flow path of the upstream external pipe 101 communicate with each other. Specifically, the upstream pipeline member 62 has a cylindrical shape and is held in a state of being inserted into the upstream side of the insertion hole 29 of the center block 2. The upstream side of the flow path of the upstream pipeline member 62 communicates with the flow path of the upstream connection portion 60, and the downstream side of the flow path of the upstream pipeline member 62 communicates with the flow path of the built-in tube 13.

Here, an inner diameter of the built-in tube 13 is set to be larger than an inner diameter of the upstream external pipe 101. As a result, a flow velocity of the fluid flowing into the built-in tube 13 from the upstream external pipe 101 decreases, and thus, the flow rate can be measured even when the fluid is flowing through the upstream external pipe 101 at a high velocity. Note that the inner diameter of the built-in tube 13 and the inner diameter of the upstream external pipe 101 may be the same, or the inner diameter of the built-in tube 13 may be smaller than the inner diameter of the upstream external pipe 101 although not illustrated.

The downstream pipeline member 63 is provided between the built-in tube 13 and the downstream connection portion 61 and is a member that makes the flow path of the built-in tube 13 and the flow path of the downstream external pipe 102 communicate with each other. Specifically, the downstream pipeline member 63 has a cylindrical shape, and is held in a state of being inserted into the downstream side of the insertion hole 29 of the center block 2. The downstream side of the flow path of the downstream pipeline member 63 communicates with the flow path of the downstream connection portion 61, and the upstream side of the flow path of the downstream pipeline member 63 communicates with the flow path of the built-in tube 13.

The ultrasonic flowmeter 1 further includes a circuit board 65. The circuit board 65 is arranged so as to cover the first ultrasonic element 11, and extends substantially parallel to the pipe axis X of the built-in tube 13. The first ultrasonic element 11 and the second ultrasonic element 12 are connected to the circuit board 65. Furthermore, a pressure measurement unit 66 that measures the pressure of the fluid flowing through the flow path of the built-in tube 13 and a control unit 67 are mounted on the circuit board 65. The control unit 67 may be provided outside. The pressure measurement unit 66 includes a pressure sensor configured to convert the pressure of the fluid into an electric signal and output the electric signal, and specifically, a strain gauge or the like can be used.

An arrangement structure of the pressure measurement unit 66 will be specifically described. In the upstream part of the center block 2, a tubular portion 22 into which a pressure receiving portion 66a of the pressure measurement unit 66 is fitted is provided so as to protrude in a direction orthogonal to the pipe axis X of the built-in tube 13. A sensor sealing member 23 made of an O-ring is provided between an inner surface of the tubular portion 22 and an outer surface of the pressure receiving portion 66a, and airtightness between the tubular portion 22 and the pressure receiving portion 66a is secured by the sensor sealing member 23.

Furthermore, a communication path 24 communicating with the flow path of the built-in tube 13 is provided between the built-in tube 13 and the upstream connection portion 60 in the upstream part of the center block 2. The communication path 24 includes a first channel 62b penetrating through a peripheral wall of the upstream pipeline member 62 and a second channel 2a communicating with the first channel 62b and extending to reach the pressure receiving portion 66a of the pressure measurement unit 66. The first channel 62b communicates with a part between the upstream pipe sealing member 13a and the upstream connection portion 60 inside the insertion hole 29 of the center block 2. Further, the second channel 2a also communicates with a part between the upstream pipe sealing member 13a and the upstream connection portion 60 inside the insertion hole 29 of the center block 2. As a result, the flow path of the built-in tube 13 communicates with the inside of the tubular portion 22 via the communication path 24, and the pressure receiving portion 66a of the pressure measurement unit 66 is provided to face the communication path 24. Note that the pressure measurement unit 66 may be provided on the downstream side of the built-in tube 13 although not illustrated.

The ultrasonic flowmeter 1 also includes an indicator lamp 68, an operation unit (operation button), and a display panel (not illustrated). The indicator lamp 68 and the display panel are controlled by the control unit 67. The control unit 67 is configured by, for example, a microcomputer or the like, and controls the first ultrasonic element 11 and the second ultrasonic element 12 based on a command from an external device to start and stop flow rate measurement. Further, when a measured value falls outside a preset range, the control unit 67 changes a display mode of the indicator lamp 68 to a mode different from a previous mode. For example, a display color of the indicator lamp 68 can be changed, or the indicator lamp 68 can be made to blink. The display panel is configured by, for example, an organic EL panel, a liquid crystal panel, or the like, and displays the measured value, various types of setting information, and the like. Various settings can be made as a user operates the operation unit. An operation state of the operation unit is acquired and received by the control unit 67.

The flow rate measurement unit 53 is communicably connected to the control unit 67 via a signal line 65a. The ultrasonic signals received by the first ultrasonic element 11 and the second ultrasonic element 12 and the pressure measured by the pressure measurement unit 66 are transmitted to the flow rate measurement unit 53 via the signal line 65a. Note that the flow rate measurement unit 53 may be provided on the circuit board 65.

The flow rate measurement unit 53 can also measure a mass flow rate by using the pressure measured by the pressure measurement unit 66. When measuring the mass flow rate, a temperature sensor that measures a temperature of the fluid flowing through the flow path of the built-in tube 13 may be provided to use the temperature of the fluid detected by the temperature sensor, or a sound velocity may be calculated based on the ultrasonic signals received by the first ultrasonic element 11 and the second ultrasonic element 12, and a temperature may be estimated from the calculated sound velocity and used for measuring the mass flow rate.

As illustrated in FIG. 1, a housing 72 of the ultrasonic flowmeter 1 is a member that accommodates the first ultrasonic element 11, the first wedge member 14, the built-in tube 13, the second ultrasonic element 12, and the second wedge member 15. In the present embodiment, the circuit board 65, the pressure measurement unit 66, the center block 2, and the like are also accommodated in the housing 72. The housing 72 is divided in the flow direction of the fluid, and has a first housing constituent portion 72a and a second housing constituent portion 72b. A configuration of the housing 72 is not limited to the above-described configuration, and may be configured to be dividable in the radial direction of the built-in tube 13, for example.

(Measurement of Flow Rate of Fluid)

Figure 12A:
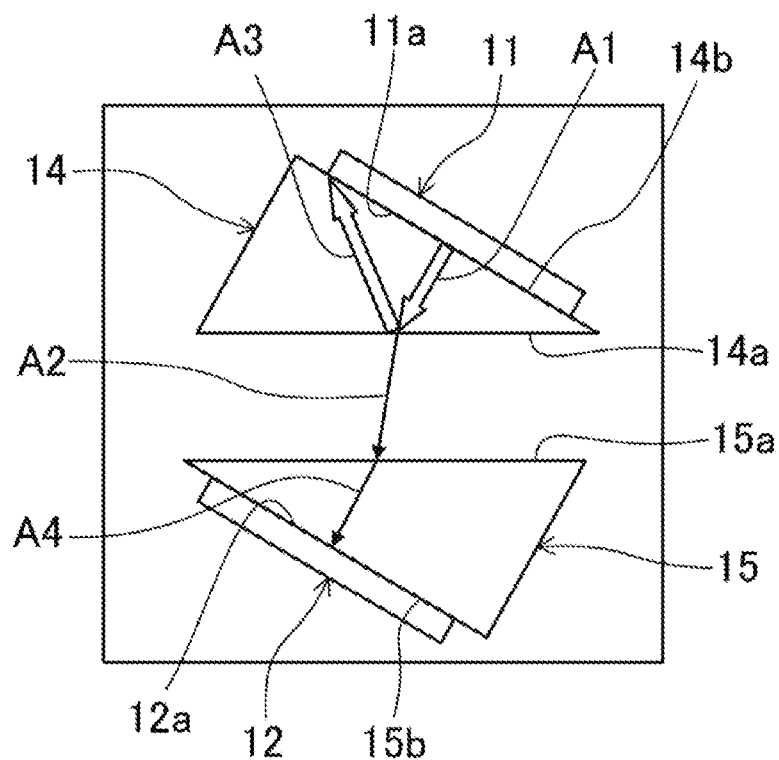
FIGS. 12A and 12B are views for describing propagation of an ultrasonic signal transmitted from a first ultrasonic element according to the second embodiment, FIG. 12A illustrating a comparative example, and FIG. 12B illustrating the invention.
Figure 12B:
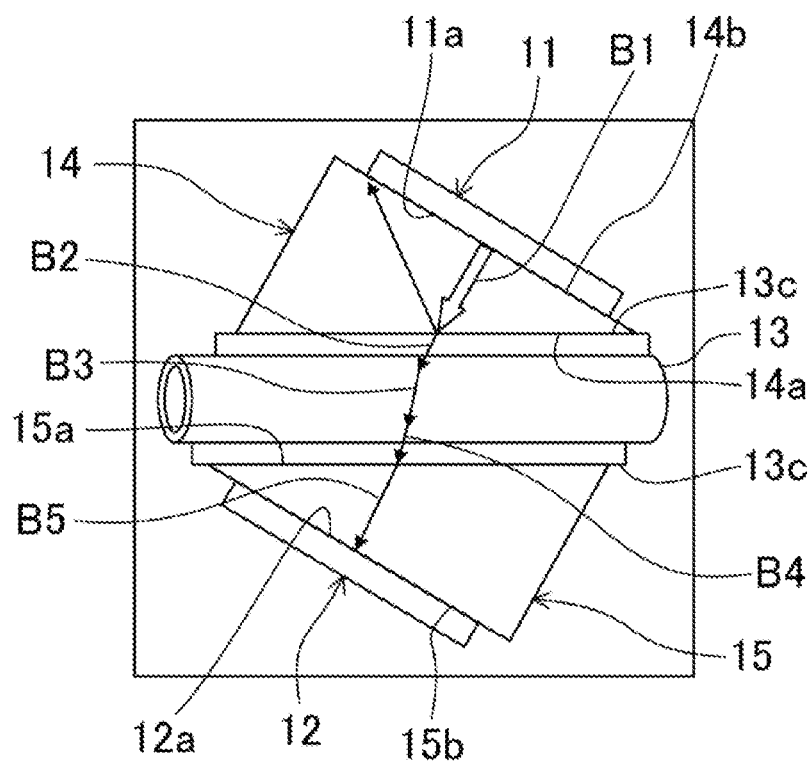

Next, a case where a flow rate of a fluid is measured using the ultrasonic flowmeter 1 configured as described above will be described. First, a comparative example will be described. FIG. 12A out of FIGS. 12A and 12B illustrates the comparative example in which the first ultrasonic element 11, the second ultrasonic element 12, the first wedge member 14, and the second wedge member 15 are arranged so as to have a similar positional relationship as in the second embodiment in a state where the built-in tube 13 is not provided. In this comparative example, an ultrasonic signal transmitted from the transmission/reception surface 11a of the first ultrasonic element 11 enters the element-side surface 14b of the first wedge member 14, propagates through the first wedge member 14 (arrow A1), and propagates from the tube-side surface 14a of the first wedge member 14 to the fluid (arrow A2). At this time, when a difference in an acoustic impedance between the first wedge member 14 and the fluid is large as in a case where the fluid is a gas, reflection at an interface between the first wedge member 14 and the fluid increases. A component of the ultrasonic signal reflected at the interface between the first wedge member 14 and the fluid is indicated by arrow A3. Since there are many reflected components, the intensity of the ultrasonic signal propagating to the fluid (arrow A2) decreases. Further, the ultrasonic signal reflected at the interface between the first wedge member 14 and the fluid stays in the first wedge member 14. The ultrasonic signal staying in the first wedge member 14 flows into a reception-side element (the second ultrasonic element 12) via a member such as the center block 2, and is received by the second ultrasonic element 12 (arrow A4). In this manner, the ultrasonic signal received through a different course from the fluid becomes a noise component and inhibits the measurement of the flow rate. Similarly, an ultrasonic signal transmitted from the second ultrasonic element 12 has many components reflected at an interface between the second wedge member 15 and the fluid, and the reflected components flows into the first ultrasonic element 11 via a member such as the center block 2, are received by the first ultrasonic element 11, and become noise components.

On the other hand, in the second embodiment illustrated in FIG. 12B, the built-in tube 13 defining the flow path is configured by a member that attenuates an ultrasonic signal, and thus, acoustic impedances of the first wedge member 14 and the built-in tube 13 are close to each other. Further, the acoustic coupling member 13c is interposed between the first wedge member 14 and the built-in tube 13. In the second embodiment, an ultrasonic signal transmitted from the transmission/reception surface 11a of the first ultrasonic element 11 enters the element-side surface 14b of the first wedge member 14, propagates through the first wedge member 14 (arrow B1), and propagates from the tube-side surface 14a of the first wedge member 14 to the acoustic coupling member 13c and the built-in tube 13 in order (arrow B2). Since the acoustic impedances of the first wedge member 14 and the built-in tube 13 are close to each other, the reflection of the ultrasonic signal at the interface between the first wedge member 14 and the built-in tube 13 is reduced, and the ultrasonic signal is attenuated in the built-in tube 13. As a result, it is possible to reduce the ultrasonic signal flowing into a reception-side element (the second ultrasonic element 12) via a member such as the center block 2, and as a result, a noise component is reduced.

After passing through the fluid in the flow path defined by the built-in tube 13 (arrow B3), the ultrasonic signal sequentially propagates to the built-in tube 13 and the acoustic coupling member 13c (arrow B4). Next, the ultrasonic signal propagates through the second wedge member 15 and is received by the second ultrasonic element 12 (arrow B5). Similarly, the ultrasonic signal transmitted from the second ultrasonic element 12 is less reflected at the interface between the second wedge member 15 and the built-in tube 13, and thus, the noise component is reduced.

Therefore, similarly to the first embodiment, the ultrasonic signal can be attenuated by the built-in tube 13 to reduce the noise component while enabling the measurement using the longitudinal wave having a relatively high signal intensity such that the mixing ratio of the shear wave to the longitudinal wave excited by the tube 100 is 10% or less in the second embodiment, and thus, the measurement is stabilized and the measurement accuracy is further improved.

The above-described embodiment is merely an example in all respects, and should not be construed as limiting. Further, all modifications and changes belonging to the equivalent range of the claims fall within the scope of the invention.

As described above, the ultrasonic flowmeter according to the invention can be incorporated in, for example, the pneumatic system or the like and used.

What is claimed is:

1. An ultrasonic flowmeter that measures a flow rate of a gas flowing in a non-metallic tube, the ultrasonic flowmeter comprising:
   a first ultrasonic element configured to transmit, as a first signal, an ultrasonic signal and receive, as a second signal, an ultrasonic signal;
   a second ultrasonic element configured to receive, as the first signal, the ultrasonic signal and transmit, as the second signal, the ultrasonic signal;
   a first wedge member having a first surface coupled to the first ultrasonic element and a second surface for connecting an outer surface of the tube, configured to propagate the ultrasonic signal including the first signal and the second signal, the first surface and the second surface forming a first angle;
   a second wedge member having a third surface coupled to the second ultrasonic element and a fourth surface for connecting the outer surface of the tube, configured to propagate the ultrasonic signal, the third surface and the fourth surface forming a second angle;
   a housing that accommodates the first ultrasonic element, the first wedge member, the second ultrasonic element, and the second wedge member; and
   a flow rate measurement unit that measures the flow rate of the gas flowing in the tube based on a propagation time difference of a longitudinal wave, excited in the tube, among the first signal and the second signal of the ultrasonic signals transmitted and received between the first ultrasonic element and the second ultrasonic element,
   wherein the first angle of the first wedge member and the second angle of the second wedge member are configured in such a manner that the tube excites both the longitudinal wave and a shear wave and a mixture ratio of the shear wave to the longitudinal wave is 10% or less.

2. The ultrasonic flowmeter according to claim 1, wherein acoustic coupling members are interposed between the first wedge member and the outer surface of the tube and between the second wedge member and the outer surface of the tube, respectively.

3. The ultrasonic flowmeter according to claim 1, wherein a support portion, which supports the outer surface of the tube from a direction different from a direction in which the first wedge member and the second wedge member oppose each other, is provided.

4. The ultrasonic flowmeter according to claim 3, wherein the first wedge member and the second wedge member are arranged to sandwich the tube from both sides in a radial direction, and
   the support portion includes a first support portion and a second support portion that support the tube from both sides in the radial direction.

5. The ultrasonic flowmeter according to claim 4, wherein a distance between the first support and the second support is set to be narrower than an outer diameter of the tube, and the tube is pressed and deformed by the first support portion and the second support portion.

6. The ultrasonic flowmeter according to claim 5, wherein a distance between the first wedge member and the second wedge member is set to cause the tube to be pressed in the radial direction.

7. The ultrasonic flowmeter according to claim 6, wherein a relief margin for releasing a part of the tube after deformation is provided in a space surrounded by the first wedge member, the second wedge member, the first support portion, and the second support portion.

8. The ultrasonic flowmeter according to claim 1, wherein the housing includes a first housing and a second housing that are arranged to sandwich the tube in a radial direction and are coupled to each other.

9. The ultrasonic flowmeter according to claim 8, wherein the first wedge member and the first ultrasonic element are accommodated in the first housing, and
   the second wedge member and the second ultrasonic element are accommodated in the second housing.

10. An ultrasonic flowmeter that measures a flow rate of a gas flowing in a non-metallic tube, the ultrasonic flowmeter comprising:
    a first wedge member having a sound velocity of 1800 m/s or more and 2500 m/s or less, and configured to propagate an ultrasonic signal; is arranged outside the tube that
    a second wedge member having a sound velocity of 1800 m/s or more and 2500 m/s or less, and configured to propagate an ultrasonic signal; is arranged outside the tube
    a first ultrasonic element disposed on the first wedge member, configured to transmit, as a first signal, an ultrasonic signal toward a gas flowing in the tube through the first wedge member and an outer surface of the tube, and configured to receive, as a second signal, an ultrasonic signal from a gas flowing in the non-metallic tube through the outer surface of the tube and the first wedge member and;
    a second ultrasonic element disposed on the second wedge member, and configured to receive, as the first signal, the ultrasonic signal from the gas flowing in the non-metallic tube through an outer surface of the tube and the second wedge member, and configured to transmit, as the second signal, the ultrasonic signal toward the gas flowing in the tube through the second wedge member and the outer surface of the tube;

a housing that accommodates the first wedge member, the second wedge member, the first ultrasonic element, and the second ultrasonic element; and a flow rate measurement unit that measures the flow rate of the gas flowing in the tube based on a propagation time difference of a longitudinal wave, excited in the tube, among the first signal and second signal of the ultrasonic signals transmitted and received between the first ultrasonic element and the second ultrasonic element, wherein an angle formed by a surface of the first ultrasonic element that transmits and receives the ultrasonic signal and the outer surface of the tube, and an angle formed by a surface of the second ultrasonic element that transmits and receives the ultrasonic signal and the outer surface of the tube are 20 degrees or more and 40 degrees or less.

11. The ultrasonic flowmeter according to claim 10, wherein a length of the surface of the first ultrasonic element that transmits and receives the ultrasonic signal and a length of the surface of the second ultrasonic element that transmits and receives the ultrasonic signal are 30 mm or less.

12. The ultrasonic flowmeter according to claim 10, wherein the first ultrasonic element and the second ultrasonic element are configured to transmit ultrasonic signals of less than 2 MHz.

13. The ultrasonic flowmeter according to claim 10, wherein acoustic coupling members are interposed between the first wedge member and the outer surface of the tube and between the second wedge member and the outer surface of the tube, respectively.

14. The ultrasonic flowmeter according to claim 10, wherein a support portion, which supports the outer surface of the tube from a direction different from a direction in which the first wedge member and the second wedge member oppose each other, is provided.

15. The ultrasonic flowmeter according to claim 14, wherein
the first wedge member and the second wedge member are arranged to sandwich the tube from both sides in a radial direction, and
the support portion includes a first support portion and a second support portion that support the tube from both sides in the radial direction.

16. The ultrasonic flowmeter according to claim 15, wherein a distance between the first support and the second support is set to be narrower than an outer diameter of the tube, and the tube is pressed and deformed by the first support portion and the second support portion.

17. The ultrasonic flowmeter according to claim 16, wherein a distance between the first wedge member and the second wedge member is set to cause the tube to be pressed in the radial direction.

18. The ultrasonic flowmeter according to claim 17, wherein a relief margin for releasing a part of the tube after deformation is provided in a space surrounded by the first wedge member, the second wedge member, the first support portion, and the second support portion.

19. The ultrasonic flowmeter according to claim 10, wherein the housing includes a first housing and a second housing that are arranged to sandwich the tube in a radial direction and are coupled to each other.

20. The ultrasonic flowmeter according to claim 10, wherein
the first wedge member and the first ultrasonic element are accommodated in the first housing, and
the second wedge member and the second ultrasonic element are accommodated in the second housing.

* * * * *